April 18, 1967  S. A. BOETTCHER  3,314,328
SURFACE MEASURING DEVICE
Filed April 22, 1963  2 Sheets-Sheet 1

INVENTOR
STEPHEN A. BOETTCHER
BY Brown, Jackson
Boettcher + Dienner
ATTORNEYS

April 18, 1967  S. A. BOETTCHER  3,314,328
SURFACE MEASURING DEVICE

Filed April 22, 1963 2 Sheets-Sheet 2

INVENTOR
STEPHEN A. BOETTCHER
BY Brown, Jackson,
Boettcher & Dienner
ATTORNEYS 3,314,328
SURFACE MEASURING DEVICE
Stephen A. Boettcher, Evanston, Ill., assignor to Speedlap Supply Corporation, Skokie, Ill., a corporation of Illinois
Filed Apr. 22, 1963, Ser. No. 274,627
5 Claims. (Cl. 88—14)

This invention relates to devices for measuring or checking the surface flatness of a work piece.

In many machine shop operations, it is important to know the flatness of a particular surface of a work piece. This is particularly true, for example, in lapping operations where the surface of a machine part or the like is abraded or otherwise reduced to approach flatness. It will also be true in various finishing operations or wherever surface shape has significance. In the mentioned lapping operation, it is advantageous to be able to check the unlapped surface at the start of the operation in order to gauge the depth of cut and therefore the time required to lap the surface to flatness within preset tolerance limits. Also there is an advantage in being able to subsequently check the flatness of the surface not only after it has been lapped but also at some intermediate stage in the lapping operation.

The use of mechanical or other devices which traverse the surface to probe its profile is not practical in the usual machine shop operation and/or demand an amount of skill not normally available in such establishments in order to meet the standards of accuracy required. Measurement of surface shape by the use of optical flats has also been tried. Again in the machine shop they have only limited application and demand an amount of attention as well as skill in interpreting the wave band pattern which is not always available. Moreover, the optical flat technique is useful only when the surface being checked for flatness has a polish or a light reflective characteristic sufficient to cooperate in producing the optical pattern. Often a surface before it has been machined or lapped is dull or has a texture which is not conducive to flatness checking by use of optical flats. Furthermore, the method is sensitive to variations from true flatness amounting to a fraction of a wavelength of light, for example, in the order of 11 millionths of an inch, whereas in the usual machine shop operation, acceptable flatness tolerances more usually lie within the range of perhaps .0001 to .100 inch. Since the variation from flatness is determined by counting the number of bands which are intersected by an imaginary line drawn tangent to one band, the check is conducted by distinguishing between the extent of curvature of the bands which represent an acceptable departure from flatness and the total curvature viewed. The method is thus susceptible to error particularly when practised by one having little familiarity or skill.

Therefore, a principal object of the present invention is to provide a device for checking surface flatness which will not be dependent on the reflective characteristics of the surface under check and at the same time will provide a visual simultaneous check of the total area of said surface and one which can be easily read, that is demanding a minimum amount of attention or skill on the part of the reader.

A second important object of the invention is to provide such a device, which can be adjusted so as to provide a ready check for different standards of flatness.

In the accomplishment of these objects, the invention provides a horizontal support on which the surface to be checked may be rested. This support is in the form of a flat grating consisting of closely spaced parallel opaque lines. Collimated light is passed through the grating from beneath at an acute angle to the horizontal so as to produce shadows of the grating lines on the surface being checked which are viewed at the opposite angle through the convenience of a mirror. In accordance with the angle of the collimated light, the angle of the line of sight and the spacing of the grating lines, the variations from flatness of the surface under check will cause certain of the line shadows and/or portions thereof to be visible through the spaces between the lines and will cause other line shadows to be hidden or partially hidden from view. The result is to produce a graphic visual pattern of dark and light bands very similar in appearance to the interference pattern achieved utilizing optical flats. Variations from flatness in the surface under check will produce corresponding curvatures or bowing from a parallel, straight linear relation which is taken to indicate flatness. However the number of band widths through which a particular band is bowed will indicate a variation from flatness of the order of the width of the lines and spacings which comprise the grating. For example, when the grating comprises 1000 lines ruled to the inch, each line and space will be .0005 inch wide and is disposed exactly normal to the line of sight, then the bowing of the bands through the width of one band (one line and one space), would suggest a variation from surface flatness of .001 inch. If the grating were ruled 500 lines to the inch, then said bowing would indicate a variation from flatness of .002.

It is also possible to change the effective width of the spacings between the grating lines, by disposing them at some angle other than normal but less than parallel. In this way, the measure of flatness can be changed. For example, if the grating is rotated either clockwise or counterclockwise so as to dispose the grating lines at 60° off normal to the line of sight, the effective width of the spacing is doubled. If it is rotated 70½°, the width of the spacings is effectively increased threefold. If the grating is turned 75½°, the width of the spacings is effectively increased fourfold. Other settings can also be determined using well known principles of trigonometry. In the above examples therefore, if the grating comprised lines ruled 1000 to the inch, in the present setting (that is, with the lines exactly normal to the line of sight) the extent of curvature from a straight line would represent a departure of .001 inch per light band in measuring the surface flatness of a work piece. However, when the grating was rotated 60° therefrom, the extent of curvature would represent a departure of .002 inch per light band from flatness and when it was rotated 75°, would represent a departure of .003 inch per light band.

Furthermore, when the surface under check is sufficiently flat through its total area as to be within the tolerances for which the grating is set, the bands are not apparent and the optical pattern is one of essentially uniform color. However, if the work piece is tilted slightly, then the pattern of dark and light bands becomes apparent and if the surface profile is flat or varies therefrom much less than the effective spacing between the grating lines, the darkened light bands will be seen as essentially straight parallel lines.

Thus an important feature of the invention is that it provides a device in which the total surface of a work piece may be checked for flatness at the same time, rather than comprising a consequential checking of a series of points on said surface with the possibility of missing defective spots.

Another important feature of the invention is that it is applicable to checking a variety of different surfaces to ascertain departures therein from flatness. For example it is useful to check surfaces that have been machined, ground or lapped, pressed, molded or cast, also of a variety of materials such as paper, rubber and ceramic as well as metallic. Likewise it is not material whether the surface is shining or dull. Even polished glass with a foggy coating can be checked for flatness by use of the invention.

Moreover, because the surface or surfaces to be checked can be rested on a horizontal support, there is less problem with irregular shaped parts. The device can also be used to check squareness of angles or parallelism of parts, using appropriate mounting fixtures.

Also, because no contact pressure other than gravity is required, the device permits checking even extremely flexible pieces.

Another feature of the invention is that it provides a device in which the standards for flatness can be infinitely adjusted within given limits and which limits can also be changed by substituting a second grating member in which the opaque lines are ruled to a different quantity per inch.

Still another feature of the invention is the provision of such a checking device with means in the form of baffles which enforces both the angle at which the reader views the pattern of grating lines and their shadows and the angle at which the collimated light is directed through the grating.

A corollary feature is the provision and location of said baffles so that they also serve to occlude the collimated light beam from the reader's vision or illuminating the mirror which might detract and/or interfere with its interpretation of the pattern which he views in the mirror as formed by the grating lines and their shadows against the surface of the work piece being checked.

Still another object of the invention is to provide such a device as a compact, light weight, rugged package of small size so that it may be conveniently transported and used in any of several locations, either in the factory, machine shop, laboratory or other establishment.

Many other objects, advantages and features of the invention will be at once apparent or will become so from the detailed description of one embodiment thereof which now follows and serves to illustrate the invention. In the said description thereof, it will be understood that many changes as well as modifications, substitutions and rearrangements of parts may be made within the scope of the invention and said description is intended therefore not to be considered in a limiting sense but only as aforementioned to illustrate the same.

Referring therefore to the drawings wherein like parts are identified by like reference numerals:

Figure 1:
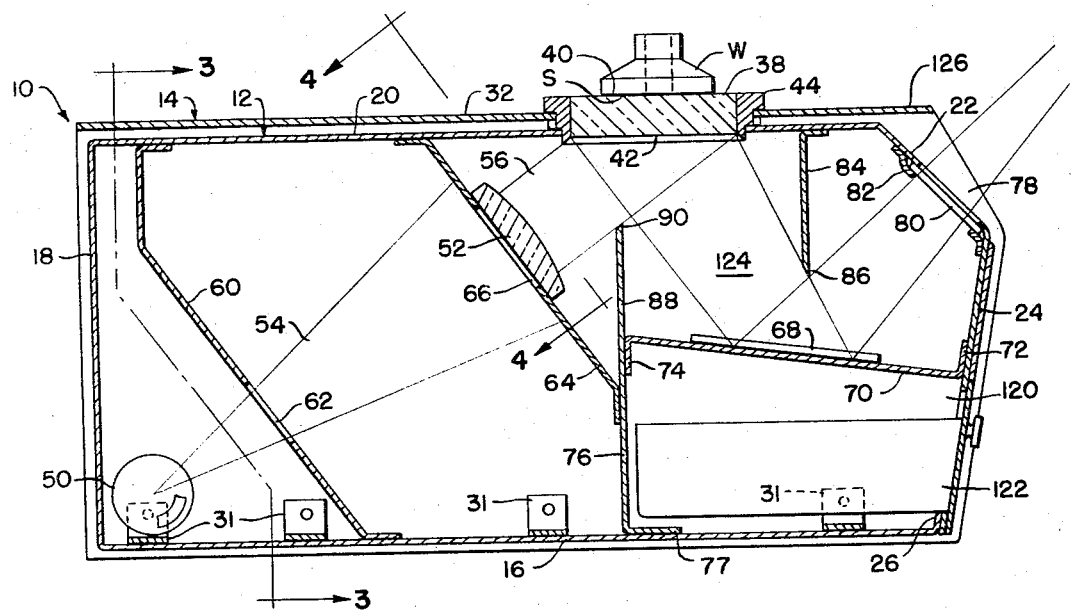
FIGURE 1 is a vertical view taken in section lengthwise through a device comprising one form the invention may take and illustrates the relation of its important components.

Now, referring more specifically to the several views and first to FIGURE 1, the invention is there illustrated embodied in a two piece casing 10 comprising a five-sided supporting form indicated generally at 12 and a U-shaped cover member indicated generally at 14 having portions to cover the otherwise two open sides of form 12. Said supporting member 12 is seen in FIGURE 1 to comprise a single sheet of metal folded to comprise a bottom wall 16, rear vertically extending wall 18, a horizontally disposed top wall 20, an inclined forward wall 22, indicated as disposed at approximately a 45° angle with respect to the horizontal, and a second inclined forward wall 24 which is shown inclined rearwardly approximately 10° from vertical. The lower end of wall 24 is welded or otherwise secured to the upturned flanged end 26 comprising the right end of bottom wall 16 of said sheet metal member 12. Member 12 thus comprises an integral five-sided form having open side walls for convenient access to the component parts for which 12 serves as a support. As previously mentioned, the two open sides of said form 12 are enclosed by the depending side walls 28 (FIGURE 3) of the U-shaped cover 14 which also includes a top wall 32 arranged in spaced relation across the top wall 20 of said form 12. Cover 14 may be detachably secured to the form 12 by any convenient means and in FIGURES 1 and 3, form 12 is shown provided with cross pieces 30 welded to the top side of bottom wall 16 and disposed at spaced intervals. These pieces have their opposite upturned ends 31 provided with threaded openings which align with provided openings in the lower margin of walls 28 of cover 14 so as to receive externally threaded screws or other connecting members 29.

The top wall 32 of cover 14 is thus horizontally disposed and has a circular opening 34 (FIGURE 5) midway of its ends which is aligned with a circular opening 36 in the top wall 20 of form 12, which receive a transparent plate 38 having opposed parallel flat surfaces 40 and 42 (FIGURE 1), the plate being appropriately mounted within a ring 44 having an annular recess 46 (FIGURE 5) which receives the peripheral edge of wall 32 about the opening 34 therein, the lower edge of the ring 44 protruding slightly through the provided opening 36 in wall 20 and so that the bottom surface of said plate is essentially flush with the under side of wall 20.

Upper surface 40 of transparent plate 38 is lined with a plurality of closely spaced opaque lines formed by etching or other appropriate process, said lines 46 being of the same width as their separations or spacings 48 and together constituting a grating. As an example, the grating may be ruled 1000 lines to the inch in which case each line 46 and spacing 48 therebetween will have a width of .0005 inch. This has been found to comprise a particularly useful grating for the purposes of the invention. However, in accordance with the standards of flatness desired, the device may be provided with gratings ruled with a greater or smaller number of lines per inch. For example, a particularly useful grating has been found to comprise 500 lines per inch and in which instance the lines and spacings have a width of about .001 inch. Thus in accordance with the invention and to provide greater versatility, several gratings may be provided for interchangeable use with the device.

Referring again to FIGURE 1, 50 represents an incandescent lamp as a source of monochromatic light and 52 represents a plano-convex collimating lens positioned forwardly of said lamp and focused on the filtment thereof so as to convert the beam of light 54 emanating from the point source which said filament comprises, converting it into parallel light rays represented at 56 which impinge on the under side or surface 42 of the transparent plate 38, being only limitedly refracted thereby and passing between the grating lines 46 engraved on surface 40 so as to produce shadows of said lines on the under side or surface S of work piece W which is to be checked for flatness.

Figure 3:
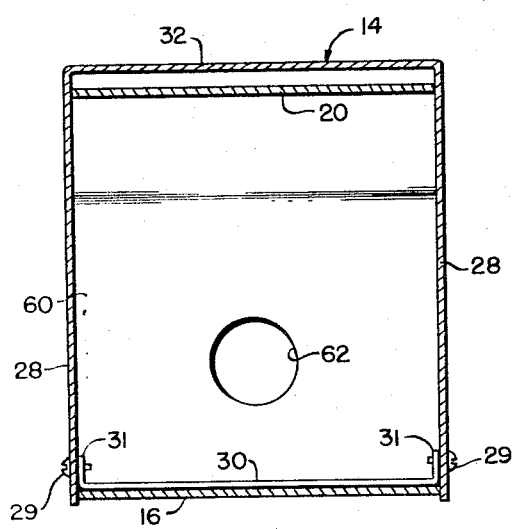
FIGURE 3 is a transverse vertical sectional view along lines 3—3 of FIGURE 1 and looking in the direction of the arrows.

Referring next to FIGURE 3 considered in conjunction with FIGURE 1, a first baffle member is provided at 60 having a circular opening at 62 which confines the light emitted from the lamp 50 to a beam of restricted conical shape which is directed to and includes the total area of the collimating lens 52. Collimating lens 52 in turn is supported on a second baffle 64 so that the parallel light rays to which it converts said beam is projected through the grating represented by 46, 48 at the required acute angle to the grating and which in the illustrated example is inclined approximately 55° from horizontal.

Figure 4:
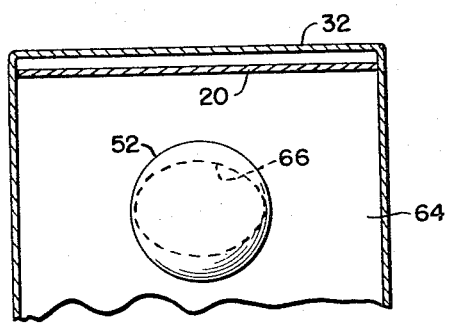
FIGURE 4 is a fragmented view along lines 4—4 of FIGURE 1 looking in the direction of the arrows.

Referring next to FIGURE 4, opening 66 in baffle 64 need not be circular and is instead made oval with its longer axis horizontally disposed so that the beam of parallel light directed by the collimating lens 52 completely floods the area of the transparent plate 38 within the confines defined by its supporting ring 42, but is essentially of no greater diameter. Preferably and advantageously, baffles 60 and 64 as well as interior surfaces of form 12 and of side walls 28 of cover 14 are painted with a low reflective, preferably black, paint. Spaced below and slightly forward of transparent plate 38 and supported on bracket 70 is a mirror 68, said mirror 68 being disposed at a small angle to the horizontal which in the illustrated embodiment comprises about 7°. Bracket 70 preferably has its opposite ends flanged as at 72 and 74, end 70 being welded to the inner side of front wall 24 of form 12 and its flanged end 74 being welded to a vertically extending baffle wall 76 having its lower flanged end 77 welded to the bottom wall 16 of said form 12. It will be appreciated that supporting bracket 70 and vertically extending baffle 76 are not only opaque and coated with a black low reflective paint, but also are of dimensions to extend across the width of the form 12. Therefore with the cover 14 in position extraneous light cannot enter the collimating light chamber as for example from compartment 120 which said baffles 70 and 76 with bottom wall 16 and front wall 24 of form 12 comprise. As illustrated in FIGURE 1 this compartment 120 may be usefully adapted to receive a drawer 122 in which extra lined plates 38 may be stored as well as other miscellany. Referring still to FIGURE 1, it will be seen that inclined wall 22 is provided with a suitable opening at 78 which may be rectangular in shape (FIGURE 2) and enclosed by a transparent plate 80 supported by appropriate channel means 82 to provide a window through which a reader may view the pattern of grating lines and their shadows on surface S of work piece W by viewing the mirror 68 at the proper angle.

A vertical baffle is advantageously provided at 84 which is of a length so as to enforce a particular angle of viewing the mirror 68 and whereby the reader's line of sight is at the proper angle for seeing the optical pattern of light and dark patterns which the collimated light rays impinging on plate 38 and passing between the grating lines 46 produce upon striking the surface S of a work piece rested on said grating (top surface 40). In the illustration the axis of this line of sight is approximately 45° when the mirror 68 is considered angled thereto about 7° off horizontal. The lower edge of said baffle 84 is feathered at 86 and mirror 68 is so offset from directly beneath the lined plate 38 that a reader looking through window 78 at the enforced angle sees the whole area of plate 38 in mirror 68 and thereby the described optical pattern. A second baffle is also provided at 88 having a feathered edge at 90 so as to accommodate the desired full view of transparent plate 38 in mirror 68 while also limiting both the size of the collimated light beam 56 and preventing a view thereof from window 78. Baffles 84 and 88 therefore tend to prevent illumination of the mirror so that the interior of the chamber represented at 124 containing the mirror is essentially dark, and wherefore the pattern of light and dark patterns appearing on mirror 68 in reflected light from plate 38 are more distinct and easily discerned at the enforced viewing angle. Consequently the viewer in looking through window 80 at the enforced angle sees in the darkness only the illuminated portion or light pattern of the reflected image. Portions 126 of cover 14 which overhangs the front inclined wall 22 and along the sides thereof also inhibits entrance of exterior light through window 80 and so further assists in darkening the interior of chamber 124 and thereby to improve the contrast of the dark and light bands of the pattern viewed in reflection.

Figure 2:
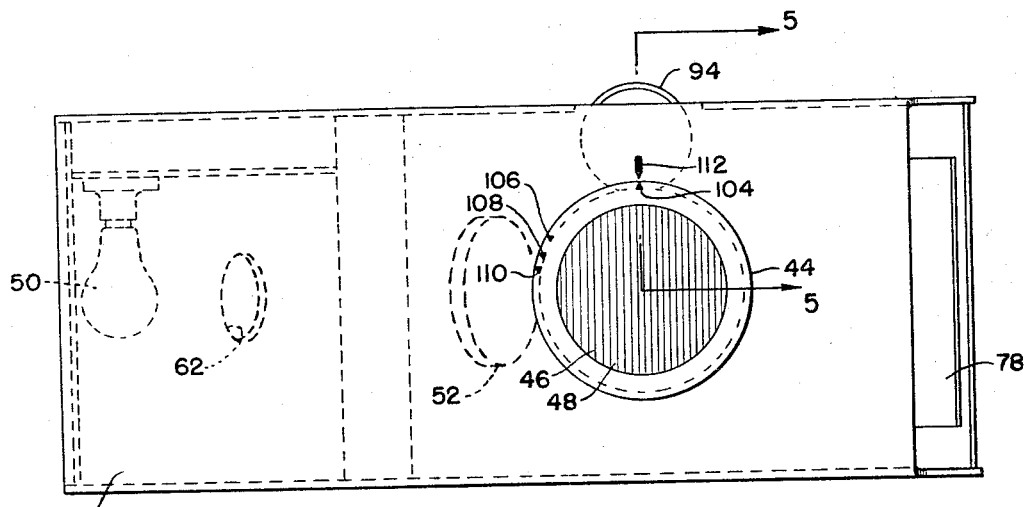
FIGURE 2 is a top plan view of said device.

Referring now to FIGURE 2, it will be seen that the grating lines 46 are illustrated disposed in their primary position which is transversely of the device and at right angles to the line of the reader's sight. As previously indicated when so disposed the collimated light passing through the grating lines 46 produces shadows thereof on the surface S which are displaced therefrom in accordance with the extent of departure from flatness of that portion of the surface S. Of consequence at the enforced viewing angle, all or portions of certain of said line shadows will be hidden behind other grating lines or will be visible through the spaces 48 between said lines in accordance with the amount said surface departs from flatness to produce a pattern across said surface comprising alternating light and dark bands, the width of the bands being a function of the spacing 48 between the grating lines 46 as well as width of said lines 46 and, of course, the angles in which the collimated light is directed and the angle at which the surface S is viewed. A band is here defined as the center to center distance between either two white or two dark stripes or equivalent. If the bands are straight across the surface S, this means that the surface S is flat. If they are not straight this indicates a departure from flatness, the extent of non-straightness indicating the extent of departure from flatness.

Figure 6:
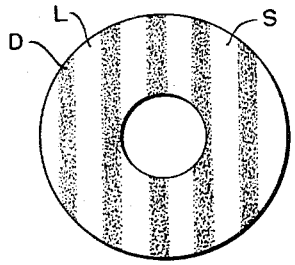
FIGURES 6 through 9 illustrate the various patterns comprising dark and light bands which are produced in the use of the illustrated embodiment of the invention and indicate the extent of flatness in the surface of work pieces being checked.

Referring therefore to FIGURES 6–9, D represents the dark bands and L the intervening light bands. In FIGURE 6 these lines are essentially parallel and straight across the surface so that surface S may be considered flat within the accuracy or tolerances permitted by the line spacings 48. If surface 40 of plate 38 had been ruled 1000 lines to the inch, the pattern in FIGURE 6 indicates that the checked surface has a departure from flatness within the tolerance limits of .0001.

Figure 7:
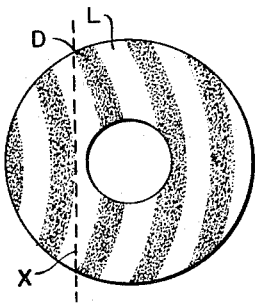

Referring next to FIGURE 7, the optical pattern of dark and light bands is there illustrated as being somewhat concave and when considered in reference to dotted line X, one sees that the extent of curvature is equal to approximately the width of one half band. This suggests that the surface being checked is not flat within the previously named tolerance but is .0005 away from flatness.

Actually, the pattern seen in FIGURE 6 will be apparent only if the work piece is slightly tilted on surface 40. If surface S is flat against the grating represented by lines 46 and spacings 48, no appreciable pattern will appear and the surface S will have an essentially uniform color. Therefore, a check can be worked out if the departure from flatness which can be tolerated is less than .0005 and gratings ruled 1000 lines to the inch are used. The reader need merely rest the work piece with its surface S on the grating. If he sees more than one color, the work is rejected. Such a reject system may be worked out for any tolerance by selection of a grating with the proper number of lines to the inch.

Figure 9:
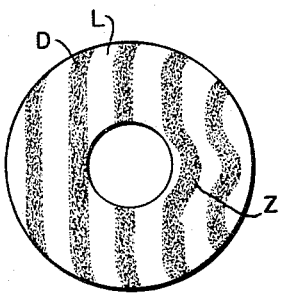

Referring now to FIGURE 9, the dark and light bands are essentially straight and also parallel as well as being equally spaced through the major area of surface S. There is, however, a noticeable falling off near the outer edge of the surface S. This indicates that the edge of the work piece is rounded rather than flat although the major portion of the surface is flat. The distortion which is seen at Z in the righthand dark bands D suggests that in this area of surface S there is a low spot.

Figure 8:
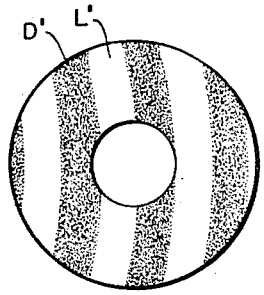

As previously stated, the width of the apparent dark and light bands D and L comprising the optical pattern viewed on surface S is a function of the spacing between the grating lines 46. By rotating plate 38 either clockwise or counterclockwise, it is possible to alter the effective width of said spacing 48 so as to lower the accuracy or increase the tolerance in departure from flatness which the viewer reads by observing the curved configuration of the dark and light bands comprising the optical pattern. As thus far described in connection with FIGURES 6, 7 and 9, lines 46 were considered as ruled 1000 to the inch and disposed perpendicular to the line of sight. In practice, it has been found possible to read band deviations up to 10 or more bands with ease. However, by rotating plate 38 60° therefrom, the apparent spacing in the lines is doubled, at 70½° it is increased threefold, and at 75½° the spacing has been increased fourfold. Thus, for example, if a tolerance greater than .0005 in the considered example is acceptable, this may be accommodated without substituting a new plate 38 and grating line ruling by merely rotating the plate 38, until the grating lines 46 are set at an angle in which the effective spacing of the lines corresponds to the departure from flatness which can be tolerated. For example, with the grating lines 46 set parallel to the line of sight as illustrated in FIGURE 2, the work piece is illustrated by FIGURE 7 to be off-flatness by approximately .00025 inch. However, by setting the lines 46 so that they are at 60° from the position illustrated by FIGURE 2, then the optical pattern of dark and light bands as illustrated at D′ and L′ in FIGURE 8 is obtained which indicates that the surface S of the work piece has an acceptable flatness.

Therefore, in accordance with the invention, it is proposed that the ring 44 which supports plate 38 is rotatably mounted in opening 34 of cover 14 and its outer periphery provided with teeth 92. These teeth 92 mesh with the teeth 94 of a gear or other appropriate operating member 96 which is rotatably supported to one side thereof and between wall 32 of cover 14 and wall 20 of form 12 as illustrated best in FIGURE 5.

Figure 5:
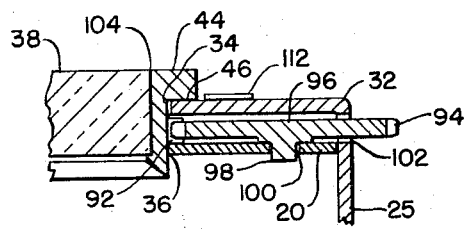
FIGURE 5 is a sectional view along 5—5 of FIGURE 1 looking in the direction of the arrows.

Referring to said FIGURE 5, operating member 96 is shown rotatably supported on wall 20 by means of its central depending stud portion 98 which rotatably fits in a provided opening 100 in said wall 20, its outer periphery extending through a provided slot 102 in cover wall 28. Therefore by thumbing the peripheral portion of said operating member 96 which protrudes through said slot 102, it is possible to turn member 96 and thereby rotate ring 44 to adjust grating 46, 48 on the top surface 40 of transparent plate 38 to some desired angle.

Advantageously, the outer cylindrical wall of the transparent plate 38 is provided with suitable marks indicated at 104, 106, 108, 110, in FIGURE 2, as an example. An index mark 112 is also engraved or otherwise located on the top surface of cover wall 32 adjacent the periphery of ring 42. Said index mark 112 is so located that when mark 104 is aligned therewith, the grating is set for its finest reading. Marks 106–110 indicate other possible settings. For example, when mark 106 is aligned with index 112, this may be interpreted to indicate that the apparent spacing between the grating lines 46 has been doubled and therefore the accuracy is proportionately reduced. Similarly when mark 108 is aligned with index 112, the spacing has been multiplied fourfold and when mark 110 is aligned with index 112, the apparent spacing has been multiplied sixfold. Consequently, considering plate 38 to have its lines 46 ruled 1000 to the inch, when mark 104 is aligned with index 112 this will indicate the device is set to tolerate .0005 inch from flatness, at 106 to tolerate a departure of .001 inch, at 108 to tolerate a departure of .002 inch, and at 110 to tolerate a departure of .003 inch.

Obviously other settings can be ascertained so that various degrees of flatness check can be obtained with acceptable tolerances set to vary all the way from .0005 to .002 inch and greater. Furthermore, by replacing the transparent plate 38 in which the grating lines are ruled at some other number of lines per inch, still further tolerances of acceptable flatness can be worked out.

From the above description of the preferred embodiment of the invention it will be apparent that all of the recited objects, advantages and features of the invention have been demonstrated as obtainable in a simple device which is convenient to operate and because the read-out is graphic, the operation can be readily understood and mastered even by the unskilled, almost from instinct and with a minimum of instruction.

As previously suggested, the optical pattern of dark and light bands becomes more pronounced and therefore more readily visible when the surface to be checked is tilted at a slight angle to the grating. It therefore may be desirable in repetitive work to adjust the "read-out" pattern by the use of thin plastic shims used under one side of the work piece. Also as suggested, it is possible to set the device to give a "go—no-go" type of reading. For example, if the entire surface of the piece appears to be of essentially the same color, this means that the piece will be considered as "passed." On the other hand, if the opposite color appears, then the piece in the space where color appears is beyond the flatness tolerance for which the device has been set and should be rejected. It will be further evident that a device such as described is peculiarly adapted to provide immediate advantages in statistical quality control, in speeding general inspection of work pieces for flatness of surface either on the machine shop floor or in the laboratory, for following wear of surfaces in machine parts, to check plastic flow of parts, to check results of heat distortion, to predict die sharpening, to assist in analyzing chatter controlling grinder performance (spindle run-out and looseness as well as wheel specifications), and also to select as well as measure projections, burrs, plating build-up on parts.

Thus having described my invention, I claim:

1. A device for checking the surface flatness of a work piece comprising a horizontally-disposed grating having closely spaced parallel lines on which to rest the side of the work piece which is to be checked for surface flatness, means for directing a beam of collimated light from beneath and through said grating at an angle other than one lying in the plane defined by a grating line and an intersecting vertical to said grating line to form grating line shadows on the surface of a work piece rested on said grating, and a mirror spaced below said grating and offset therefrom in a direction away from said collimated light beams by means of which the grating lines and their shadows may be viewed from a position above and to one side of the grating, and baffle means confining the angle of viewing the reflector to one such that said grating lines and their shadows will be visible to the viewers as comprising a pattern of dark and light bands which deviate from parallelism in accordance with the departure of said surface of the work piece from flatness, said baffle means further serving to prevent the viewer from directly viewing the collimated light beam.

2. The device as claimed in claim 1 further including means to rotate said grating so as to change the disposition angle of its lines with respect to the collimated light beam and effectively increase the spacing between the grating lines as viewed by means of the reflector element at the viewing angle which the baffle means enforce.

3. A device for checking the surface characteristic of a work piece such as its extent of flatness and comprising a casing having a horizontally disposed wall in which is supported a transparent disc the upper surface of which comprises a grating of closely spaced parallel lines on which is rested the surface of a work piece the characteristic shape of which is to be checked, said casing containing a light source adjacent one end and lens means for directing a beam of collimated light through said grating at an angle other than one lying in the plane defined by a grating line and an intersecting vertical to said grating line, a reflector supported below and forwardly of the transparent plate adjacent the opposite end of the housing so as to receive an image of a pattern produced by the collimated light passing through the grating lines and impinging on the surface of a work piece positioned thereon, the forward wall of said casing being provided with an opening through which said image is reflected for viewing from a position in front of and above the device, said casing being otherwise substantially light-tight and containing baffle means which limit the illumination of the reflector by said light source so that one views the reflector at an enforced angle and sees said reflected image in contrast to the darkened surround.

4. The device as claimed in claim 3 wherein the transparent disc is rotatably supported, and the casing includes means for turning the transparent disc to permit variation of the angle at which the grating lines are arranged with respect to the beam of collimated light.

5. A device for checking the surface characteristic of a work piece such as its extent of flatness comprising a casing having a horizontally disposed wall in which is supported a transparent disc the upper surface of which comprises a grating of closely spaced parallel lines on which is rested the surface of a work piece the characteristic shape of which is to be checked, said casing containing a light source adjacent one end of the casing and lens means for directing a beam of collimated light through said grating at an angle other than one lying in the plane defined by a grating line and an intersecting vertical to said grating line, a reflector supported below and forwardly of the transparent plate adjacent an opposite end of the casing so as to receive an image of a pattern produced by the collimated light passing through the grating lines and impinging on the surface of a work piece positioned thereon, the forward wall of said casing being rearwardly inclined and provided with a window through which an image of the illuminated grating may be viewed in the reflector from a position in front of and above the device, said casing being otherwise substantially light-tight and containing baffle means which enforce an angle at which the reflected image is viewable and limit the illumination of the reflector by said light source so that one viewing the reflector sees said reflected image in contrast to the darkened surround, said casing further including a shield which extends over the top and along the sides of said window in the front wall to shade said window and the interior of the casing from exterior light.

References Cited by the Examiner

UNITED STATES PATENTS

| | | | |
|---|---|---|---|
| 1,552,451 | 9/1925 | Roach. | |
| 1,988,556 | 1/1935 | Hunter | 88—14 |
| 2,253,054 | 8/1941 | Tuttle et al. | 88—14 |
| 2,857,798 | 10/1958 | Seliger | 88—14 |
| 2,867,149 | 1/1959 | Goddard | 88—14 |
| 2,902,898 | 9/1959 | Kops | 88—14 |
| 3,124,638 | 3/1964 | Loro | 88—14 |

JEWELL H. PEDERSEN, *Primary Examiner.*

A. A. KASHINSKI, *Assistant Examiner.*